United States Patent [19]

Wengler

[11] Patent Number: 5,297,835
[45] Date of Patent: Mar. 29, 1994

[54] STRAP STYLE ARTICLE CARRIER

[76] Inventor: James J. Wengler, 2328 Monroe St. NE., Minneapolis, Minn. 55418

[21] Appl. No.: 43,011

[22] Filed: Apr. 5, 1993

[51] Int. Cl.⁵ .......................... A45F 5/10; B65D 63/18
[52] U.S. Cl. ...................................... 294/146; 294/157
[58] Field of Search ................ 294/31.2, 74, 138, 141, 294/142, 146, 147, 149-157, 165, 170; 119/96, 101, 102; 150/157; 190/100, 102, 110, 115; 206/319; 224/214, 250; 440/76, 77, 113

[56] References Cited

U.S. PATENT DOCUMENTS

| 187,716 | 2/1877 | Kirk | 294/165 |
|---|---|---|---|
| 562,021 | 6/1896 | Phelan | 294/155 |
| 799,793 | 9/1905 | Kinsella | 294/155 |
| 1,187,496 | 6/1916 | Bullock | 294/155 |
| 1,847,501 | 3/1932 | Stahler | 294/157 |
| 2,422,235 | 6/1947 | Greene | 294/138 |
| 2,434,784 | 1/1948 | Bardin | 150/157 |
| 2,475,135 | 7/1949 | Haven | 150/157 |
| 2,498,113 | 2/1950 | Milner | 150/157 |
| 2,541,449 | 2/1951 | Vickers | 294/149 |
| 2,575,749 | 11/1951 | Cross | 206/319 |
| 2,978,154 | 4/1961 | Kailey | 294/154 |
| 3,092,223 | 6/1963 | Martin | 294/154 X |
| 3,172,586 | 3/1965 | Lu | 29/155 |
| 3,942,636 | 3/1976 | Matsuyama et al. | 294/156 X |
| 4,114,838 | 9/1978 | Knauf | 294/147 |
| 4,469,363 | 9/1984 | Kalla | 294/154 |
| 4,556,245 | 12/1985 | Gruenwald | 294/31.2 |
| 4,828,310 | 5/1989 | Schmidt et al. | 294/153 |
| 5,137,481 | 8/1992 | Wengler | 440/77 |

FOREIGN PATENT DOCUMENTS 747280  1/1944  Fed. Rep. of Germany ...... 440/113

Primary Examiner—Johnny D. Cherry
Attorney, Agent, or Firm—James V. Harmon

[57] ABSTRACT

The invention provides an article carrier (10) having a handle (22) formed from flexible material at the top of the article that is to be carried (11). A pair of straps (18, 20) which form article-encircling loops are both connected to the handle (22). Where the straps (18, 20) are connected to the handle (22), each is twisted to make a half turn, i.e., 180° twist, and each is folded against itself to define an oblique angle (A) between portions of each strap (18, 20) on opposite sides of the handle (22). The strap (18) at the front end of the handle (22) diverges forwardly and the strap (20) connected to the rear of the handle diverges rearwardly. Sewing between the straps and a cover (12) terminates on either side of the handle (22) to form a sleeve which serves as an opening into which a reinforcing plate (26) is placed. Pockets (14, 16) on opposite sides of the cover (12) each have a hollow interior and each includes an upper flattened tubular portion (53) which is folded downwardly when the pocket (14, 16) is closed to help prevent water from entering either pocket (14, 16).

11 Claims, 4 Drawing Sheets

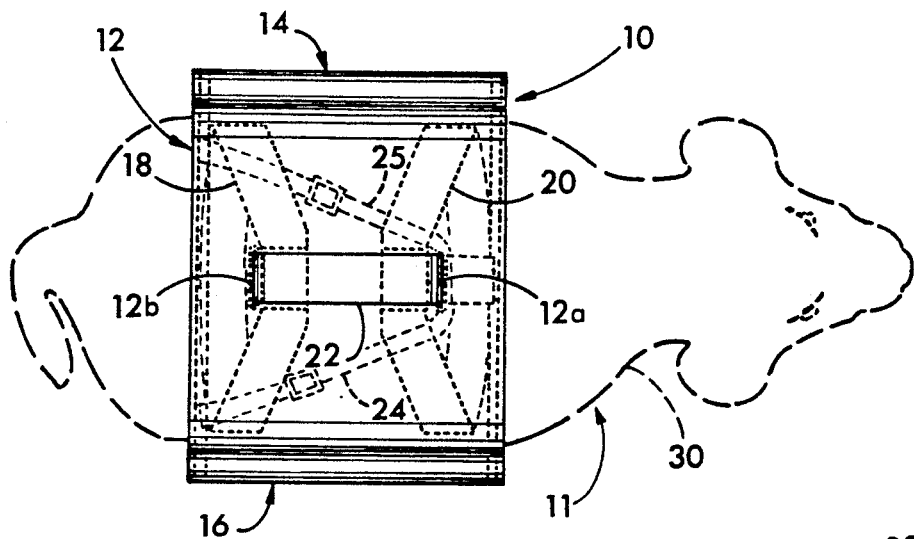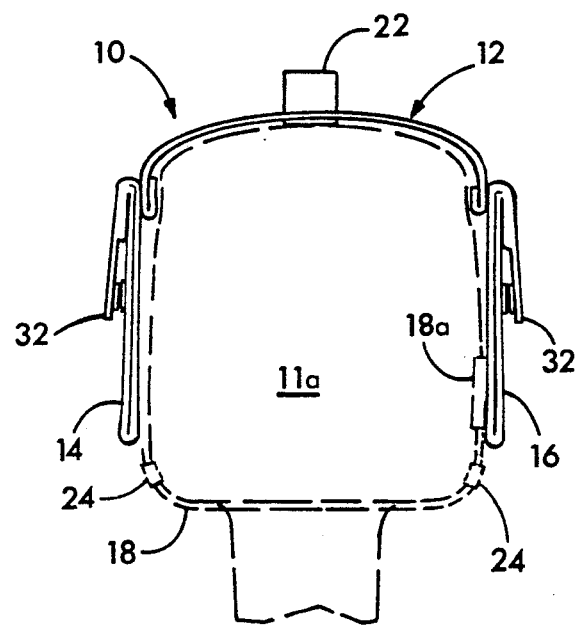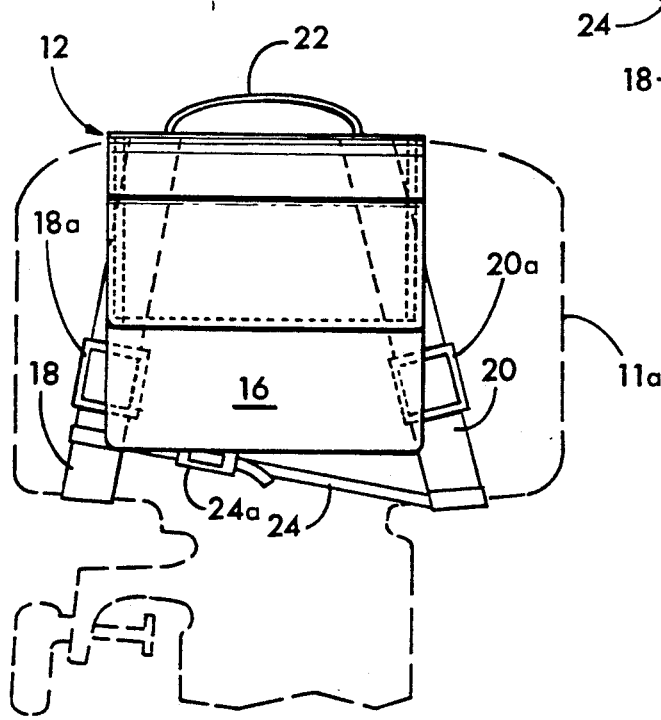

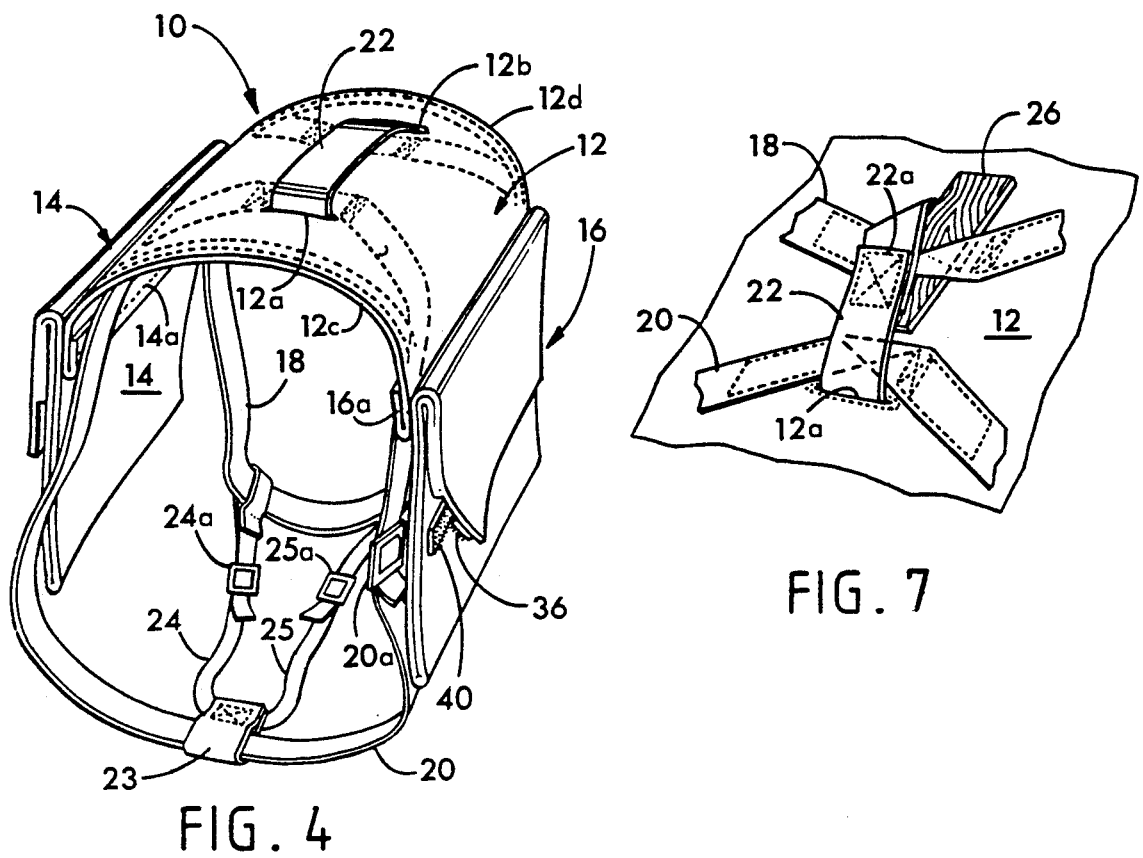
FIG. 4
FIG. 7
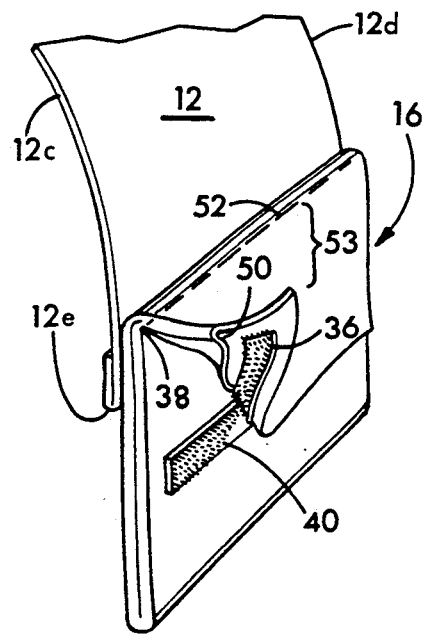
FIG. 4A

STRAP STYLE ARTICLE CARRIER

FIELD OF THE INVENTION

This invention relates to a carrier with straps that encircle the article that is being carried.

BACKGROUND OF THE INVENTION

My prior U.S. Pat. No. 5,137,481 describes an outboard motor tote that is excellent for helping a person to mount or remove a heavy article such as an outboard motor from the transom of a boat, which is an especially difficult job when the boat is bobbing about in a heavy sea. While this product is very good, there are certain areas in which performance can be improved. In my original design there was no way to orient strap portions on either side of the handle at an oblique angle without weakening the staps, for example, by cutting each strap and then sewing the cut portions together adjacent the handle. It is thus one object of the invention to find a better way of arranging the straps so that they are oriented at an oblique angle and diverge from one another at the point where they are connected to the handle without cutting or in any way weakening either the straps or the handle.

Another drawback of the prior design was the difficulty encountered in mounting a reinforcing plate and a somewhat complex layered construction employed for connecting the reinforcing plate to the handle and to the straps. Accordingly, it is another object to simplify construction where the reinforcing plate and handle are connected together and to make it easy for the reinforcing plate to be mounted in place and securely retained on the finished carrier.

In the prior design, it was sometimes possible for water to enter the pockets on the cover. It is another object of the invention to find a way of making it less likely for water to enter pockets provided on each side of the cover.

These and other more detailed and specific objects of the present invention will be apparent in view of the following description setting forth by way of example but a few of the various forms of the invention that will be apparent to those skilled in the art once the principles described herein are understood.

SUMMARY OF THE INVENTION

This invention provides an article carrier having a handle formed from flexible material, e.g., of woven fabric webbing, positioned at the top of the article that is to be carried and connected to a front and a rear strap, each of which forms an article-encircling loop. Each strap is twisted where it is connected to the handle to make a half turn, i.e., 180° twist, and is then folded against itself at the point where it is twisted to define an oblique angle between that portion of the strap on one side of the handle and the portion of the same strap on the opposite side of the handle. Each strap has a top and a bottom surface. The top surface of each strap is exposed on one side of the handle and, because of the twist, the bottom surface is exposed to view on the other side of the handle. In this way, the front strap is angled forwardly from the handle and the rear strap is angled rearwardly without weakening either of the straps.

Each of the straps has free, usually downwardly extending ends which, when the straps are placed around the article to be carried, are connected together by means of a suitable releasable fastener such as a buckle.

Sewing between the straps and a flexible cover sheet is located on either side of the handle to form a space that serves as a sleeve into which the reinforcing plate is slid, thereby securely holding it in place following assembly. The pockets on opposite sides of the article cover have a hollow interior including a hollow but flattened top portion which is folded downwardly when the pocket is closed to help prevent water from entering the pocket.

THE FIGURES

FIG. 1 is a top view of a carrier in accordance with the invention shown in use for carrying a pet;

FIG. 2 is a front view of the invention in use as a carrier for an outboard motor;

FIG. 3 is a side view of the carrier of FIGS. 1 and 2 as it appears in use as an outboard motor carrier;

FIG. 4 is a perspective view of the invention;

FIG. 4A is a partial perspective view of the right side of FIG. 4 with one end of the pocket lifted slightly to show the mouth at the top of the pocket.

FIG. 7 is a partial bottom perspective view of the carrier with the reinforcing plate being inserted;

DETAILED DESCRIPTION OF THE INVENTION

Figure 5:
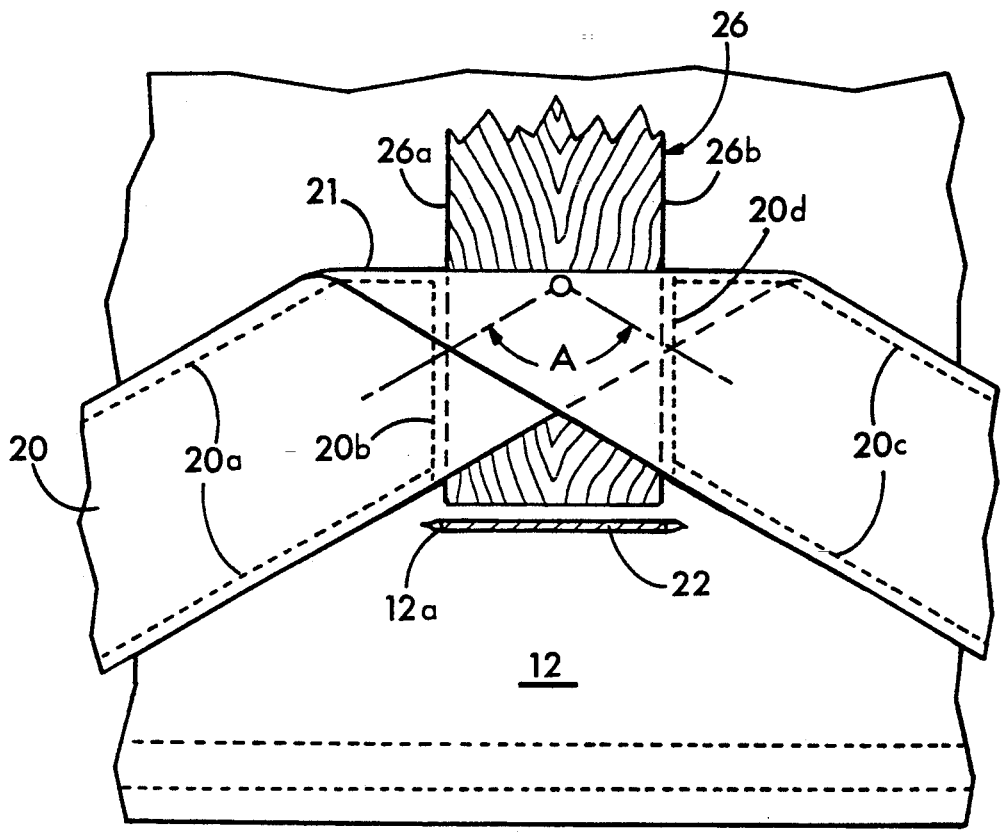
FIG. 5 is a partial bottom view of the central portion of the carrier.

The figures illustrate preferred forms of the invention that are intended for use in carrying a variety of articles. The invention, however, is particularly useful for carrying a heavy object such as an outboard motor as well as a variety of other items, e.g., articles that are to be taken aboard a power boat and sailing vessel. Although useful for various purposes, the carrier is shown in use for transporting a pet in FIG. 1 and an outboard motor in FIGS. 2 and 3. Other uses will be apparent.

The invention includes straps 18, 20 and handle 22 formed from flexible strap material, e.g., nylon or polyester webbing, typically about 4.0 cm in width. Except as described herein, the invention is formed from generally the same types of materials and in a manner similar to that described in my prior U.S. Pat. No. 5,137,481 which is incorporated herein by reference.

As shown in FIGS. 1-4, the carrier indicated generally at 10 includes a cover 12 formed from a generally rectangular sheet of flexible canvas or other suitable cloth, e.g., rubberized or plastic impregnated cloth, which conforms to and covers at least the upper surface of the article 11 being carried. Secured to the left and right sides of the cover 12, in this case by sewing along hems 14a and 16a (FIG. 4), are left and right pockets 14 and 16, respectively, which will be described in more detail below.

The carrier 10 also has front and rear article-encircling straps 18 and 20 which are connected at the top of the article 11 being carried to a strap-style handle 22 composed, for example, from 3.7 mm wide nylon webbing that is formed into a loop of the flexible woven strap material. The ends of the loop are connected together preferably by sewing. The handle 22 encircles the straps 18, 20. The straps 18 and 20 themselves enclose the article 11 being carried. The free ends of straps 18, 20 are connected together by buckles 18a, 20a (FIG. 3), respectively, to enable each strap to be released and refastened as required for mounting and removing the carrier 10 on the article such as a pet dog 11 (FIG. 1) or outboard motor 11a (FIGS. 2–4).

It will be seen that the straps 18, 20 diverge so as to extend away from one another proceeding away from the handle 22 (FIGS. 1, 3 and 4). This has several important benefits. It allows the straps 18, 20 to conform better to the surface of the article 11 being carried. It also places their lower ends much further apart than the distance between the ends of handle 22.

Figure 6:
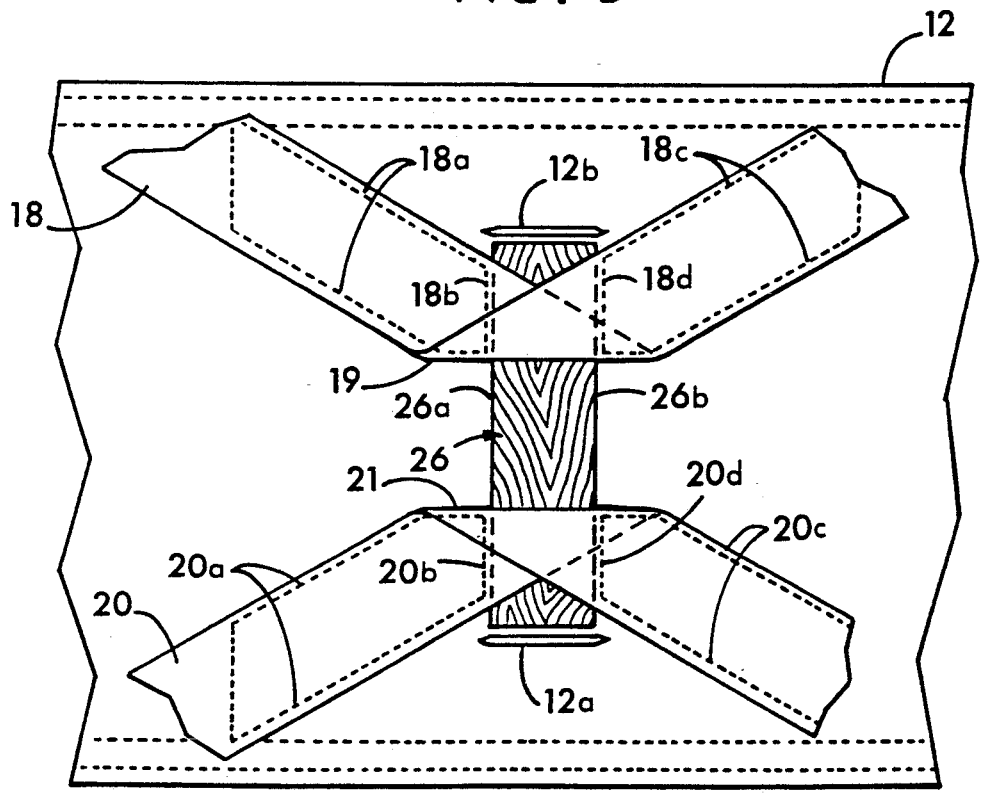
FIG. 6 is a view similar to FIG. 5 on a smaller scale showing the handle portion of the carrier.

The straps 18, 20 each have a special arrangement for causing them to diverge from one another and to conform smoothly to the surface of the article 11 that is being carried without any sacrifice of strength. As best seen in FIGS. 5 and 6, the straps 18, 20 are each provided with a one-half turn, i.e., a 180° twist, and each has a fold located at the point of the 180° twist. For example, strap 18 as shown in FIG. 6 is provided with a 180° twist at the location of the carrying handle 22 and is also folded along a line 19 at the point where the twist is located so that the portions of the strap 18 on opposite sides of the handle 22 intersect at an oblique angle. Both the left and right portions of strap 18 diverge from the strap 20. Similarly, the strap 20 is provided with a one-half turn, i.e., a 180° twist and is folded at that point along a fold line 21. Portions of both of the straps 18, 20 on either side of the handle 22 intersect at an angle A which can be about, say, 140°.

The folds in straps 18, 20 are designated 19 and 21, respectively. In this way, the top surface of the strap on one side of the handle 22 is visible and the bottom surface of the same strap can be seen on the other side of the handle 22. Thus, each of the straps 18, 20 by virtue of the 180° twist and folds 19, 21 achieves the proper angle A of intersection and diverges from one another so that their lower portions are spread some distance apart, yet the straps 18, 20 conform smoothly to the surface of the article 11 being carried. In this way a divergence of the straps 18, 20 from one another is achieved without sacrificing the strength of either strap.

Adjacent to the point where each strap 18, 20 is twisted, the cover 12 is provided with slits 12a and 12b through which the strap handle 22 passes. Thus, a portion of the strap handle 22 extends below each of the straps 18, 20 and a portion extends upwardly through the slits 12a, 12b and is visible as seen in FIGS. 1-3 above the cover 12. The ends of the handle 22 are connected together to form a loop, e.g., by sewing at 22a (FIG. 7). During manufacture, the strap handle 22 is passed through slits 12a, 12b in cover sheet 12 and the free ends are connected below the straps 18, 20 by means of sewing at 22a.

Connected between the lower portions of the straps 18, 20 are two lateral tie straps 24, 25 (FIGS. 3 and 4). Straps 24 and 25 are conveniently formed from one long strap, the center part of which is stitched to a short loop 23 of strap material, e.g., cloth webbing that encircles strap 20. Straps 24 and 25 prevent the lower ends of the straps 18, 20 from spreading too far apart, i.e., maintain straps 18, 20 securely in place against the lower portion of the article that is being carried. The lateral tie straps 24, 25 are provided with releasable fasteners or buckles 24a, 25a (FIGS. 3 and 4).

Beneath the straps 18, 20 and in alignment with the handle 22 is a reinforcing plate 26 in the form of a flat bar or plate which is usually about 12 cm to 14 cm long, about 3 cm wide, and about 2 mm to 5 mm thick. The reinforcing place 26 can be formed from any suitable strong, stiff material such as wood, plastic resin reinforced with fiberglass, metal, etc. Wood has been found satisfactory.

Straps 18, 20 are secured to the lower face of the cover 12 in a special way for enabling the reinforcing plate 26 (FIGS. 5-7) to be easily mounted and reliably retained in position just below the strap handle 22 and between the straps 18, 20 and the cover 12. This accomplished by stitching the straps 18 and 20 to the cover 12 on either side of the reinforcing plate 26 to leave a gap or sleeve that facilitates insertion of the reinforcing plate 26 as shown in FIG. 7. Specifically, strap 18 is secured to the cover 12 by means of aligned, laterally spaced apart, longitudinally extending rows of stitching 18b and 18d which are parallel and just slightly further apart than the space required for the plate 26. Similar rows of parallel, laterally spaced apart stitches 20b and 20d are provided between strap 20 and the cover 12. The rows of stitches 18b, 18d are connected to stitching 18a and 18c that extend longitudinally along each edge of strap 18. In a similar manner, edge stitchings 20a and 20c extend along each edge of strap 20 proceeding away from the stitching 20b, 20d.

During manufacture, the straps 18, 20 are stitched to the cover 12. The handle 22 is then inserted through the openings 12a, 12b and its free ends sewn together at 22a. The handle 22 is then forced to one side away from the fold 19 (see FIG. 7). The reinforcing plate 26 is then inserted by sliding it in between the spaced apart rows of stitches 18b, 18d and 20b, 20d which act as a sleeve or pouch for receiving and holding the reinforcing plate 26. When the handle 22 returns to its normal position as shown in FIGS. 1-4, plate 26 is securely held in place between the straps 18, 20 and the lower portion of handle 22. During use, the reinforcing plate 26 keeps the handle 22 from buckling even when the carrier 10 is heavily loaded. In this way, the twist in each of the straps 18, 20 at the folds 19, 21 acts in cooperation with the stitching and with the reinforcing plate 26 to provide excellent strength and shock resistance as well as assuring comfort for the hand when the carrier 10 is being lifted manually by handle 22.

As seen in FIGS. 4 and 4A, the pocket 16 is a hollow, generally flattened tubular pouch with an upper mouth 50 that is positioned above a laterally extending fold line 52, the left end of which is designated 38. Extending upwardly from the mouth 50 when the pocket is open, is a cover flap 54 provided with a detachable fastening means such as a hook-and-loop fastener strip, e.g., Velcro ® strip, 56 which during use is secured to a complementary Velcro strip 40. Pocket 14 of FIG. 4 is similar. When either pocket 14 or 16 is to be closed, an upper flattened tubular portion 53 which is located above the fold line 52 is folded downwardly as shown about the transverse fold line 52, and the Velcro ® closure elements 36, 40 are connected together the keep the respective pockets 14 or 16 closed.

Figure 8:
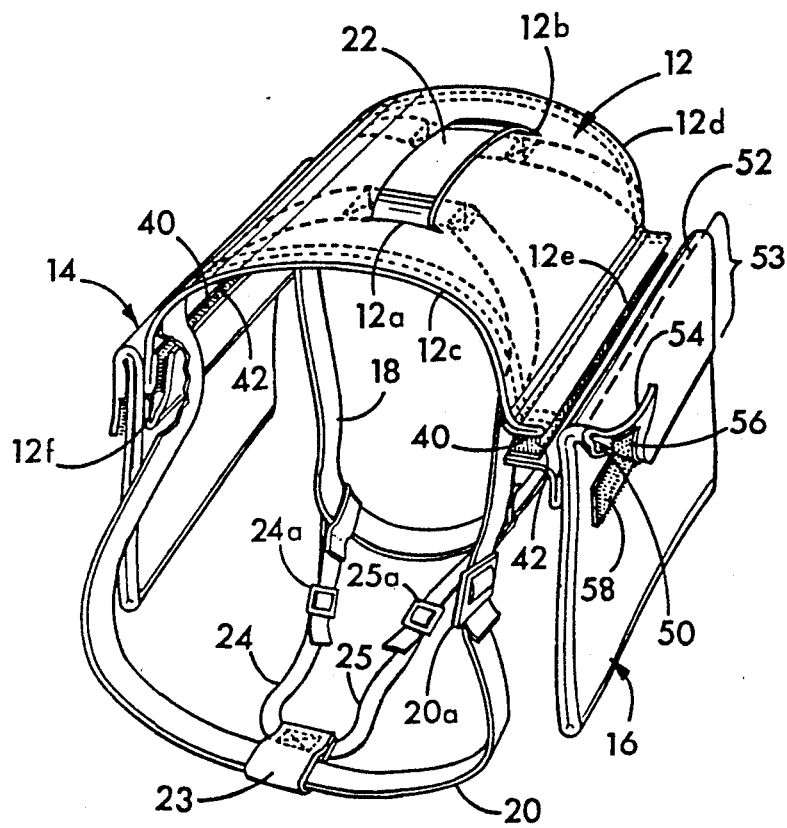
FIG. 8 is a partial perspective view of the carrier as the pocket is being mounted in place on the cover.

Refer now to FIG. 8 which illustrates one form of pocket in accordance with the invention. The following remarks apply to both pockets 14 and 16 of FIG. 8.

As shown in FIG. 8, the canvas cover 12 has front and rear edges 12c, 12d and side edges 12e and 12f. In the embodiment of FIG. 8, the pockets 14, 16 are removably secured to the side edges 12e and 12f of the cover 12 by means of detachable hook and loop fastener strips such as Velcro ® strips 40, 42. The Velcro ® strip 42 is permanently attached to each pocket 14, 16 by sewing (not shown).

Each pocket 14, 16 is a hollow, generally flattened tubular pouch with an upper open mouth 50 that is positioned considerably above a laterally extending fold line 52. Extending upwardly from the mouth 50 is a cover flap 54 provided with a detachable fastening means such as a hook and loop fastener strip, e.g., Velcro ® strip 56, which during use is secured to a complementary Velcro ® strip 58. When the pocket 14, 16 is to be closed, an upper flattened, tubular portion 53 of either pocket 14, 16 which is located above the fold line 52 is folded downwardly as shown in FIG. 8 about the transverse fold line 52, and the Velcro ® closure elements 56, 58 are connected together to keep the pocket 14, 16 closed. By providing a flattened tubular upper portion 53 above the fold line 52, it is very unlikely for moisture to leak in from the outside. It should be noted that both the inner and outer walls of the pockets 14 or 16 are pressed together where the tubular pocket is flattened and both walls are folded along the transverse fold line 52, making it very difficult for water to enter the pocket even during long periods of rainy weather.

Figure 9:
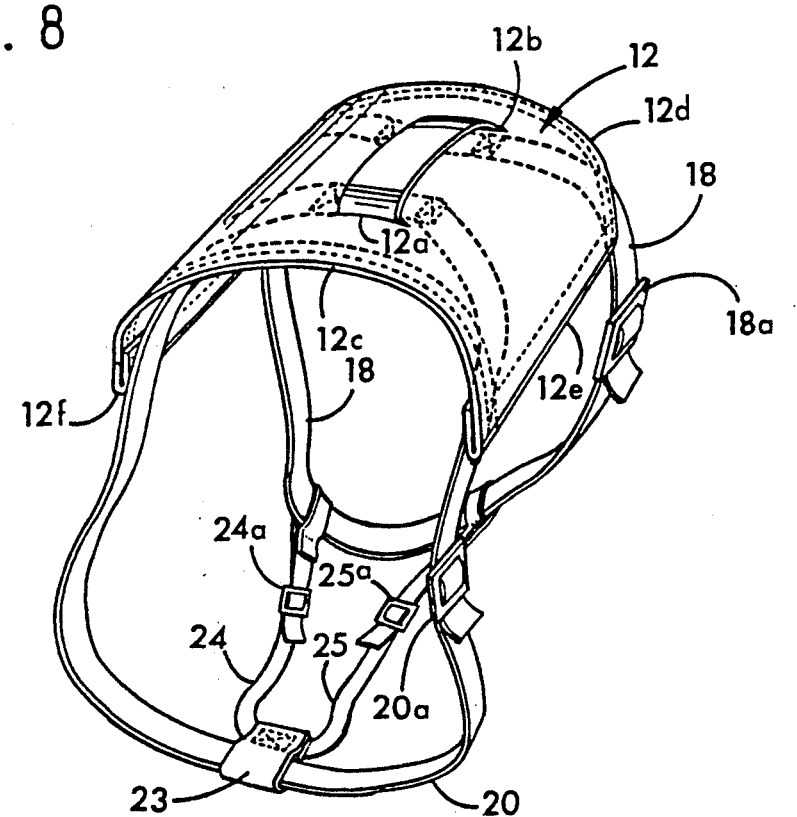
FIG. 9 is a perspective view of another form of carrier in accordance with the invention.

Refer now to FIG. 9. In FIG. 9, the cover 12 is similar to that described above and includes a rear edge 12d, a front edge 12c, and side edges 12e and 12f. While a hem is provided along the side edges 12e and 12f, there is no Velcro ® strip 40 and no pocket is provided. This embodiment of the invention is more economical and, while the top of the motor is protected by the cover 12, the sides of the motor are unobstructed and hence more accessible to the operator for repair or maintenance.

Many variations of the present invention within the scope of the appended claims will be apparent to those skilled in the art once the principles described herein are understood.

What is claimed is:

1. An article carrier having a top and a bottom, comprising:
   a flexible carrying handle at the top of the article carrier,
   a pair of downwardly extending straps connected to the handle and including a first strap and a second strap, each strap is adapted to be placed to extend around at least a portion of the article,
   releasable fasteners connected to the straps for securing the straps in place around the article,
   each strap has a top surface and a bottom surface and each of the straps has a 180° twist therein adjacent to the carrying handle with each of the straps being folded against itself at the 180° twist so that the top surface of each strap faces upwardly on one side of the handle and the bottom surface of each strap faces upwardly on an opposite side of the handle, and
   parts of each strap on opposite sides of the carrying handle are oriented at an oblique angle relative to one another so that upper portions of the strap that pass through the handle are relatively close together and lower portions of the straps diverge from one another and are located further apart than the upper portions.

2. The article carrier of claim 1 wherein tie members are connected between lower portions of the straps to prevent lower portions of the straps from spreading apart while the article is being carried.

3. The article carrier of claim 1 wherein a reinforcing plate is provided, the straps are sewn to a sheet of flexible material along pairs of parallel, laterally spaced, longitudinally extending lines of stitching between the straps and the sheet to form a reinforcing plate receiving sleeve therebetween, the stitching is spaced apart by a predetermined distance and said reinforcing plate is slidably and removably mounted in the sleeve formed between the stitches below the handle.

4. The article carrier of claim 3 wherein the handle comprises a flexible strap of fabric webbing having ends which are connected together below the straps and beneath the reinforcing plate.

5. The article carrier of claim 1 wherein the carrier includes a flexible cover sheet secured to the top thereof, said cover sheet extends toward either side of the article being carried during use, and at least one pocket is secured to the cover sheet and each such pocket includes a flattened upper tubular portion having an upper open mouth and having a transverse fold line between the upper open mouth and a lower portion of the pocket, the upper flattened tubular portion of the pocket being folded downwardly along said transverse fold line when the pocket is closed and fastener means is provided on the pocket for securing the pocket in a closed position.

6. The article carrier of claim 5 wherein the pocket is removable and remountable upon the cover sheet by means of a releasable fastener positioned between the cover sheet and the pocket for removably mounting the pocket upon the cover sheet.

7. An article carrier having a top and a bottom, comprising:
   a flexible carrying handle at the top of the article carrier,
   a pair of downwardly extending straps connected to the handle and including a first strap and a second strap, each strap is adapted to extend around a lower portion of an article being carried and each of the straps forming a loop for encircling the article that is to be carried,
   each strap has a top surface and a bottom surface and each of the straps has a 180° twist therein adjacent to the carrying handle with each of the straps being folded against itself at the 180° twist so that the top surface of each strap is exposed on one side of the handle and the bottom surface of each strap is exposed on an opposite side of the handle,
   parts of each strap on opposite sides of the carrying handle are oriented at an oblique angle relative to one another so that upper portions of the strap that pass through the handle are closest together and lower portions of the straps diverge from one another,
   a reinforcing plate is provided,
   the straps are sewn to a sheet of flexible material along pairs of parallel, laterally spaced, longitudinally extending lines of stitching between the straps and the sheet to form a reinforcing plate receiving sleeve therebetween, the stitching is spaced apart by a predetermined distance and said reinforcing plate is slidably and removably mounted in the sleeve formed between the stitches below the handle.

8. The article carrier of claim 7 wherein the handle comprises a flexible strap of fabric webbing having ends which are connected together below the straps and beneath the reinforcing plate.

9. An article carrier having a top and a bottom, comprising:
- a flexible carrying handle at the top of the article carrier,
- a pair of downwardly extending straps connected to the handle and including a first strap and a second strap, each strap is adapted to extend around a lower portion of an article being carried and each of the straps forming a loop for encircling the article that is to be carried,
- each strap has a top surface and a bottom surface and each of the straps has a 180° twist therein adjacent to the carrying handle with each of the straps being folded against itself at the 180° twist so that the top surface of each strap is exposed on one side of the handle and the bottom surface of each strap is exposed on an opposite side of the handle,
- parts of each strap on opposite sides of the carrying handle are oriented at an oblique angle relative to one another so that upper portions of the strap that pass through the handle are closest together and lower portions of the straps diverge from one another,
- the carrier includes a flexible cover sheet secured to the top thereof,
- said cover sheet extends toward either side of the article being carried during use, and
- at least one pocket is secured to the cover sheet and each such pocket includes a flattened upper tubular portion having an upper open mouth and having a transverse fold line between the upper open mouth and a lower portion of the pocket, the upper flattened tubular portion of the pocket being folded downwardly along said transverse fold line when the pocket is closed and fastener means is provided on the pocket for securing the pocket in a closed position.

10. The article carrier of claim 9 wherein the pocket is removable and remountable upon the cover sheet by means of a releasable fastener positioned between the cover sheet and the pocket for removably mounting the pocket upon the cover sheet.

11. The article carrier of claim 10 wherein the releasable fasteners are two complementary strips of a hook and loop fastener.

* * * * *